(12) United States Patent
Sherif et al.

(10) Patent No.: US 11,505,476 B1
(45) Date of Patent: Nov. 22, 2022

(54) SUB-AMBIENT SOLAR DESALINATION SYSTEM

(71) Applicant: UNITED ARAB EMIRATES UNIVERSITY, Al Ain (AE)

(72) Inventors: Mohsen Sherif, Al Ain (AE); Fadi Alnaimat, Al Ain (AE); Bobby Matthew, Al Ain (AE)

(73) Assignee: UNITED ARAB EMIRATES UNIVERSITY, Al Ain (AE)

( * ) Notice: Subject to any disclaimer, the term of this patent is extended or adjusted under 35 U.S.C. 154(b) by 0 days.

(21) Appl. No.: 17/715,912

(22) Filed: Apr. 7, 2022

(51) Int. Cl.
*C02F 1/06* (2006.01)
*B01D 3/06* (2006.01)
(Continued)

(52) U.S. Cl.
CPC .............. *C02F 1/06* (2013.01); *B01D 1/0035* (2013.01); *B01D 3/06* (2013.01); *B01D 3/42* (2013.01); *B01D 5/006* (2013.01); *C02F 1/14* (2013.01); *C02F 2103/08* (2013.01); *C02F 2201/005* (2013.01); *C02F 2209/05* (2013.01);
(Continued)

(58) Field of Classification Search
USPC .................. 210/662–708; 203/10–11, DIG. 1
See application file for complete search history.

(56) References Cited

U.S. PATENT DOCUMENTS 4,129,029 A * 12/1978 Moll ..................... G01N 27/404
73/19.06
4,387,575 A * 6/1983 Wenzel ..................... F02C 1/00
60/671

(Continued)

FOREIGN PATENT DOCUMENTS

CN 102897930 A 1/2013
CN 202941290 U 5/2013
(Continued)

OTHER PUBLICATIONS

Proetto, Brandon. "Single-Stage, Venturi-Driven Desalination System." Diss. Old Dominion University, 2018.
(Continued)

*Primary Examiner* — Nina Bhat
(74) *Attorney, Agent, or Firm* — Nath, Goldberg & Meyer; Richard C. Litman

(57) ABSTRACT

The sub-ambient solar desalination system includes a solar pond and a pressure reducing structure. The solar pond is adapted for receiving saltwater and heating the saltwater through direct exposure to solar radiation at atmospheric pressure. The pressure reducing structure is in fluid communication with the solar pond for receiving heated saltwater therefrom. The pressure reducing structure is configured such that pressure of the heated saltwater within a central portion of the pressure reducing structure is at sufficiently reduced sub-ambient pressure to undergo a phase change to produce pure water vapor and a concentrated brine solution. The pressure reducing structure has a vapor outlet for releasing the pure water vapor, which is collected in a fresh water tank and condensed into pure liquid water. The solar pond is in fluid communication with an outlet portion of the pressure reducing structure for recycling the concentrated brine solution back to the solar pond.

16 Claims, 3 Drawing Sheets

(51) Int. Cl.
*B01D 5/00* (2006.01)
*C02F 1/14* (2006.01)
*B01D 1/00* (2006.01)
*B01D 3/42* (2006.01)
*C02F 103/08* (2006.01)

(52) U.S. Cl.
CPC .... *C02F 2209/40* (2013.01); *C02F 2301/046* (2013.01); *C02F 2301/08* (2013.01)

(56) References Cited

U.S. PATENT DOCUMENTS

| | | | | |
|---|---|---|---|---|
| 6,193,893 | B1* | 2/2001 | Mazzei | B01D 19/0057 210/512.1 |
| 7,527,711 | B2* | 5/2009 | Ciudaj | B01D 5/0036 203/DIG. 1 |
| 8,083,902 | B2* | 12/2011 | Al-Garni | B01D 5/006 165/146 |
| 8,449,726 | B2* | 5/2013 | Alawadi | B01D 3/145 60/641.15 |
| 8,585,869 | B1* | 11/2013 | Duesel, Jr. | C02F 1/048 203/79 |
| 9,458,033 | B2* | 10/2016 | Rapoport | F03B 13/00 |
| 11,046,591 | B1* | 6/2021 | Sherif | C02F 1/06 |
| 2005/0067271 | A1* | 3/2005 | Ciudaj | C02F 1/14 203/DIG. 1 |
| 2011/0042956 | A1* | 2/2011 | Frye | F03B 17/00 290/54 |
| 2011/0109089 | A1* | 5/2011 | Frye | F03B 13/10 290/54 |
| 2012/0131813 | A1* | 5/2012 | Hogan | F26B 17/104 34/236 |
| 2013/0037223 | A1* | 2/2013 | Duesel, Jr. | B01D 1/30 159/4.01 |
| 2013/0248122 | A1* | 9/2013 | Duesel, Jr. | B01D 1/30 159/47.1 |
| 2014/0054161 | A1* | 2/2014 | Harman | B01D 5/0027 203/42 |
| 2014/0215842 | A1* | 8/2014 | Hogan | B01D 1/0082 454/329 |
| 2018/0002202 | A1* | 1/2018 | Elshafei | C02F 1/481 |
| 2018/0266395 | A1* | 9/2018 | Abramov | F03D 3/0454 |
| 2019/0280561 | A1* | 9/2019 | Abramov | F02K 7/12 |
| 2019/0280562 | A1* | 9/2019 | Abramov | F15D 1/0015 |

FOREIGN PATENT DOCUMENTS

| | | |
|---|---|---|
| CN | 106629947 A | 5/2017 |
| CN | 208038137 U | 11/2018 |
| CN | 110203988 A | 9/2019 |

OTHER PUBLICATIONS

Al-Musawi, Osamah Ah, et al. "Solar pond as a low grade energy source for water desalination and power generation: a short review." Renewable Energy and Environmental Sustainability 5 (2020): 4.

* cited by examiner

SUB-AMBIENT SOLAR DESALINATION SYSTEM

BACKGROUND

1. Field

The disclosure of the present patent application relates to solar desalination, and particularly to a sub-ambient solar desalination system that makes use of a pressure reducing structure in order to subject seawater that has been heated in solar ponds to a negative pressure, leading to its evaporation and subsequent condensation as freshwater.

2. Description of the Related Art

The market for desalination is vast, including many countries, cities, and small communities worldwide. Fresh water scarcity continues to be one of the most prominent issues facing civilization at the global level. Water requirements are especially high in arid and semi-arid regions where renewable and traditional water resources and rainfall are scarce. The lack of fresh water in such areas contributes to poor health, low nutrition, and poverty, as well as hindering efforts to improve living standards and achieve sustainable development. One of the most effective methods to alleviate water shortage is through seawater desalination.

Desalination technologies can be classified based on their salt separation mechanism into thermal desalination and membrane desalination. The most frequently applied desalination techniques are reverse osmosis (RO), multi-stage flash (MSF), multiple-effect distillation (MED), electro-dialysis (ED), and vapor compression (VP). Thermal desalination is based on the principle of heating saline water using external means to saturation temperature to convert liquid water to vapor by evaporation, and then condensing this vapor to obtain fresh water without salt. The remaining heated saline water increases in saline content and is often discarded. Membrane desalination utilizes a membrane to separate the salt from the water. In general, thermal desalination is more energy intensive than membrane desalination. Thermal desalination, however, can process water with higher salt concentrations than membrane desalination, while also producing better water quality. Among all of these desalination techniques, RO and MSF are the most commonly used.

Rapid globalization and the constantly increasing human population, especially in large cities, have increased the requirements to improve desalination processes and minimize the energy requirements and adverse impacts. Modern desalination processes have become more reliable and have expanded significantly during the last few decades. However, all of the above-described desalination processes require significant amounts of energy to produce fresh water. The need for desalination processes that are compact and scalable, with lower operating costs, higher efficiency and lower energy consumption has prompted the development of different types of desalination processes. Thus, a sub-ambient solar desalination system solving the aforementioned problems is desired.

SUMMARY

The sub-ambient solar desalination system includes a solar pond and a pressure reducing structure. The solar pond is adapted for receiving saltwater at ambient pressure and heating the saltwater through direct exposure to solar radiation. In solar ponds, three zones of water with different salinities and temperature are established. The water temperature in the lower zone may reach 70-90° C., and thus will vaporize when subjected to a relatively small reduction in pressure below ambient pressure. A pressure reducing structure is in fluid communication with the solar pond for receiving heated saltwater therefrom. The pressure reducing structure is configured such that pressure of the heated saltwater within a central portion of the pressure reducing structure is at sufficiently reduced pressure below atmospheric pressure to undergo a phase change to produce pure water vapor and a concentrated brine solution. The saltwater is pre-heated in the solar pond to a temperature of approximately 70° C. to 90° C., thus requiring only a relatively low reduction in pressure for the liquid-vapor phase change to occur. The pressure reducing structure has a vapor outlet for extracting the pure water vapor, which is collected in a fresh water tank and condensed into pure liquid water. The solar pond is in fluid communication with an outlet portion of the pressure reducing structure for recycling the concentrated brine solution back to the solar pond. An external tank may be provided for storing the fresh water.

In an alternative embodiment, multiple solar ponds are provided, each connected to the same pressure reducing structure. Each solar pond is used to produce pure liquid water in a manner similar to that of the previous embodiment, but heated saltwater at atmospheric pressure is extracted from each solar pond and cycled through the pressure reducing structure in a sequential manner, allowing one full desalination cycle to occur using one solar pond, then a following full desalination cycle using the next solar pond, etc. This allows for continuous desalination using the pressure reducing structure without having to wait for the saltwater in a single solar pond to be heated sufficiently.

These and other features of the present subject matter will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

Figure 1:
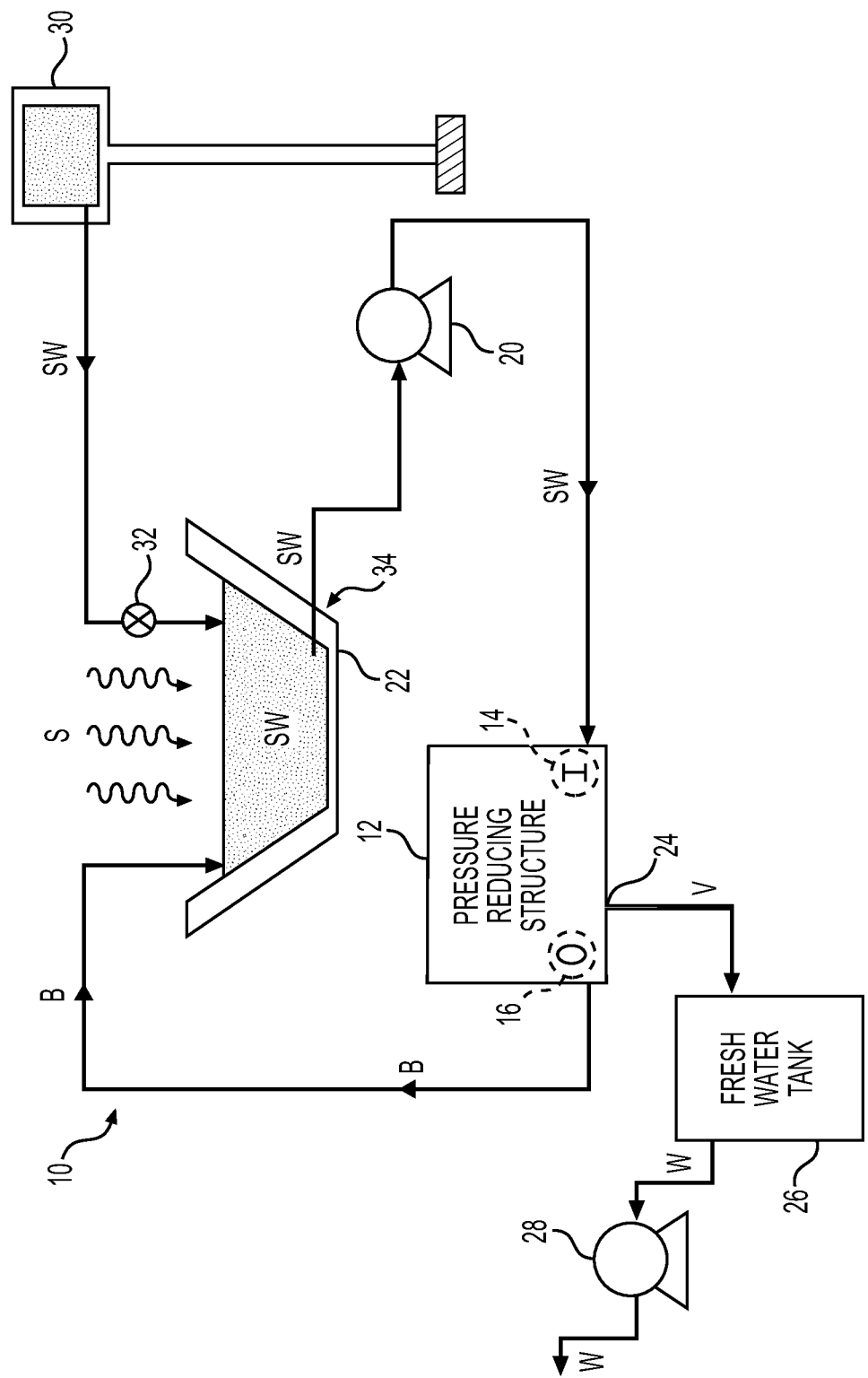
FIG. 1 is a schematic diagram of a sub-ambient solar desalination system.

As shown in FIG. 1, the sub-ambient solar desalination system, designated generally as 10 in the drawings, includes a solar pond 22 for heating saltwater SW at atmospheric pressure through direct exposure to solar radiation S and includes a pressure reducing structure 12. It should be understood that the solar pond 22 may be any suitable type of receptacle, pool, trench, pond, container or the like that is adapted for holding a volume of saltwater SW and allowing the volume of saltwater SW to be heated through direct exposure to solar radiation S at atmospheric pressure. The water in the solar pond 22 can be divided into three zones based on salt concentration and temperature. The salt concentration increases with the depth of water in the solar pond 22. The top zone has the least salt concentration, while the bottom zone has the highest salt concentration. The temperature of the water varies along the depth of the solar pond 22. The water in the top zone has the same temperature as the ambient air. The maximum temperature of the water is observed in the bottom zone. There is no mixing between the zones even though the temperature increases along the depth, and this is because of the difference in salt concentration and density. Due to the very low content of salt in the top zone, it is relatively clear, and this allows for sunlight to pass through this zone to reach the bottom zone to heat the same. Once heated to a desired temperature, saltwater SW is extracted from the solar pond 22 through an outlet port 34 by a liquid pump 20. It should be understood that the pump 20 may be any suitable type of liquid pump. The pump 20 drives the saltwater SW to and through a pressure reducing structure 12.

Figure 3A:
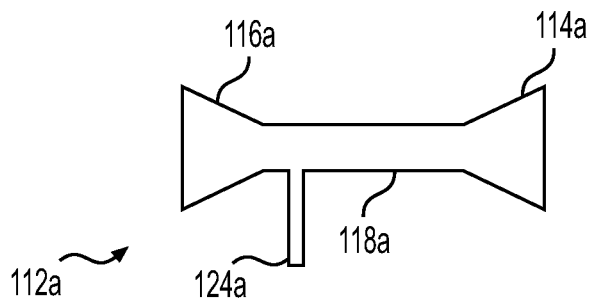
FIG. 3A is a schematic diagram of an exemplary of an exemplary pressure reducing structure having a conical inlet, a conical outlet, and a reduced diameter central portion between the inlet and outlet.

The pressure reducing structure 12 may have several different configurations, including some configurations where there is no change in elevation but there is a narrowing of cross-sectional area in the flow path, and some configurations in which there is no change in the cross-sectional area of the flow path but there is a change in elevation in the flow path. FIGS. 3A-3D show four exemplary configurations of the pressure reducing structure 12. The well-known Venturi effect describes the reduction of fluid pressure that occurs within the central portion of a tube when there is a reduction of the diameter of the tube between the inlet portion and the outlet portion (specifically at the constricting boundary between inlet portion and the central portion). FIG. 3A shows an exemplary pressure reducing structure 112a having a conical inlet portion 114a, a conical outlet portion 116a, and a narrow diameter central portion extending between the inlet portion 114a and the outlet portion 116a. A vapor outlet 124a is shown extending from the central portion 118a near the outlet portion 116a.

Since the saltwater SW drawn from the solar pond 22 by the pump 20 is an incompressible fluid, its velocity must increase as it passes through the constriction at the boundary between inlet portion 114a and the central portion 118a in accord with the principle of mass continuity, while its pressure must decrease in accord with the principle of conservation of energy (i.e., the well-known Bernoulli's principle). Here, the constriction exists as saltwater SW flows from the wider diameter inlet portion 114a into the smaller diameter central portion 118a, and the gain in kinetic energy saltwater SW attains by passing from inlet portion 114a into central portion 118a is balanced by a drop in pressure of saltwater SW within the central portion 118a.

Figure 3B:
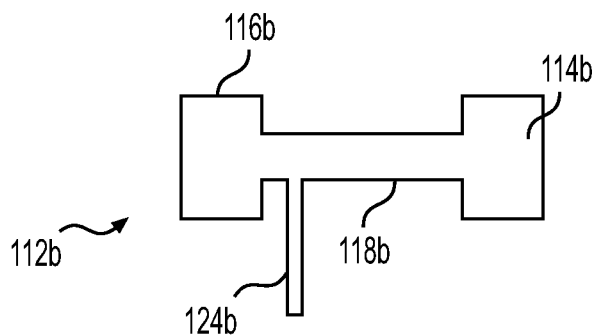
FIG. 3B is a schematic diagram of an exemplary of an exemplary pressure reducing structure having a flattened cylindrical inlet, a flattened cylindrical outlet, and a reduced diameter central portion between the inlet and outlet.

FIG. 3B shows a similar pressure reducing structure 112b in which the inlet portion 114b is connected to and in fluid communication with the outlet portion 116b by a central portion 118b smaller in diameter than either the inlet portion 114b or the outlet portion 116b, and also has a vapor outlet 124b near the outlet portion 116b. However, instead of being conical, both the inlet portion 114b and the outlet portion 116b have a flat, cup-shaped body.

Figure 3C:
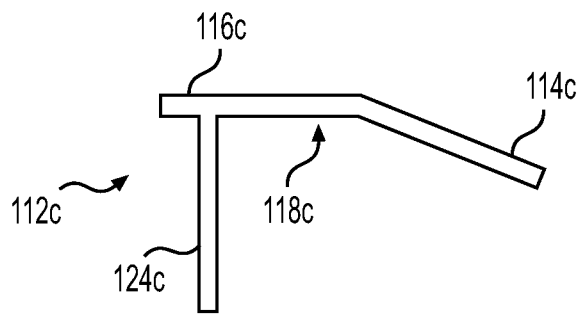
FIG. 3C is a schematic diagram of an exemplary of an exemplary pressure reducing structure having an inlet portion, an outlet portion, and a central portion between the inlet portion and outlet portion, all of equal diameter, the outlet portion being elevated.
Figure 3D:
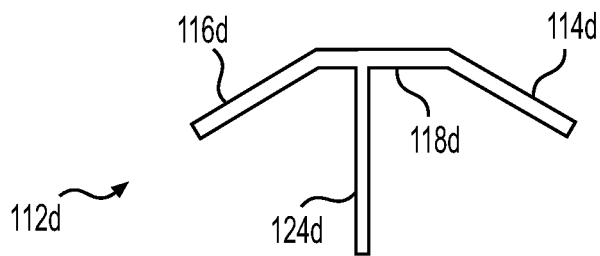
FIG. 3D is a schematic diagram of an exemplary of an exemplary pressure reducing structure having an inlet portion, an outlet portion, and a central portion between the inlet portion and outlet portion, all of equal diameter, the central portion being elevated.

FIG. 3C shows another exemplary pressure reducing structure 112c in which the inlet portion 114c, the outlet portion 116c, and the central portion 118c have constant inside diameter, but the outlet portion 116c is elevated in height. The vapor outlet 124c extends from the elevated outlet portion 116c. FIG. 3D shows a fourth exemplary pressure reducing structure 112d in which the inlet portion 114d, the outlet portion 116d, and the central portion 118d also have constant inside diameter, but the central portion 118d is elevated in height. The vapor outlet 124d extends from the elevated central portion 118d. In the pressure reducing structures 112c and 112d with change in elevation but without change in flow area, the increase in potential due to increase in elevation is compensated by reduction in static pressure. The reduction in static pressure leads to the pressure of the heated salt water SW received from the solar pond 22 dropping below its saturation pressure, subsequently leading to the evaporation of the same. The vapor generated is extracted from the elevated horizontal region. It is also fine if the change in elevation is reversed after the vapor is extracted.

The pressure reducing structure 12 is specifically dimensioned such that its pressure within the central portion is below the critical pressure for saltwater at the relatively high temperature of the saltwater SW exiting the solar pond 22, i.e., at the temperature of the saltwater SW drawn from the solar pond 22, the pressure of the saltwater SW within the central portion is below the critical pressure necessary for the saltwater SW to remain a liquid. A portion of the saltwater SW will vaporize, resulting in pure water vapor V and a concentrated brine solution B. The saltwater SW is pre-heated in the solar pond 22 to a temperature of approximately 70° C. to 90° C., thus requiring only a relatively low reduction in pressure below ambient pressure for the liquid-vapor phase change to occur in the pressure reducing structure 12. The pressure of an incompressible fluid within a pressure reducing device is related to the velocity/elevation of the incompressible fluid by Bernoulli's equation (for the special case of steady, incompressible and inviscid flows), and the velocity/elevation of the fluid can be controlled by the particular geometry of the pressure reducing structure. Thus, it should be understood that the pressure reducing structure 12 is specifically dimensioned and configured to reduce the pressure of the hot saltwater SW within the central portion (i.e., following the constriction at the boundary between the larger diameter inlet portion 14 and the smaller diameter central portion, or following the elevation of the inlet portion 14 having the same diameter as the central portion) such that it reaches the critical pressure for the liquid-vapor phase change to occur at the temperature of the saltwater SW post-heating in the solar pond 22. The critical pressure mentioned above is equal to saturation pressure corresponding to the temperature of saltwater SW that is drawn from the solar pond 22. The saturation pressure corresponding to the typical temperatures existing in the solar pond 22 is below atmospheric pressure.

In addition to the inlet portion 14 and the outlet portion 16, the pressure reducing structure 12 includes a vapor outlet 24 for releasing the pure water vapor V, which is then collected within a fresh water tank 26, where it may condense into pure liquid water W. The pure water W can be collected from the fresh water tank 26 based on requirements. The vacuum pump 28 creates a partial vacuum inside the water tank 26, which, in turn, pulls pure water vapor V into the water tank 26. The brine B still flows under the pressure caused by liquid pump 20, and exits through the outlet portion 16 of the pressure reducing structure 12. The brine B is then recycled back into the solar pond 22, where it is diluted with the saltwater SW still remaining within the solar pond 22. In order to control the salinity within the solar pond 22 and substitute for the evaporated water, additional salt water SW can be delivered from an external tank 30 under the control of a valve 32 or the like.

Figure 2:
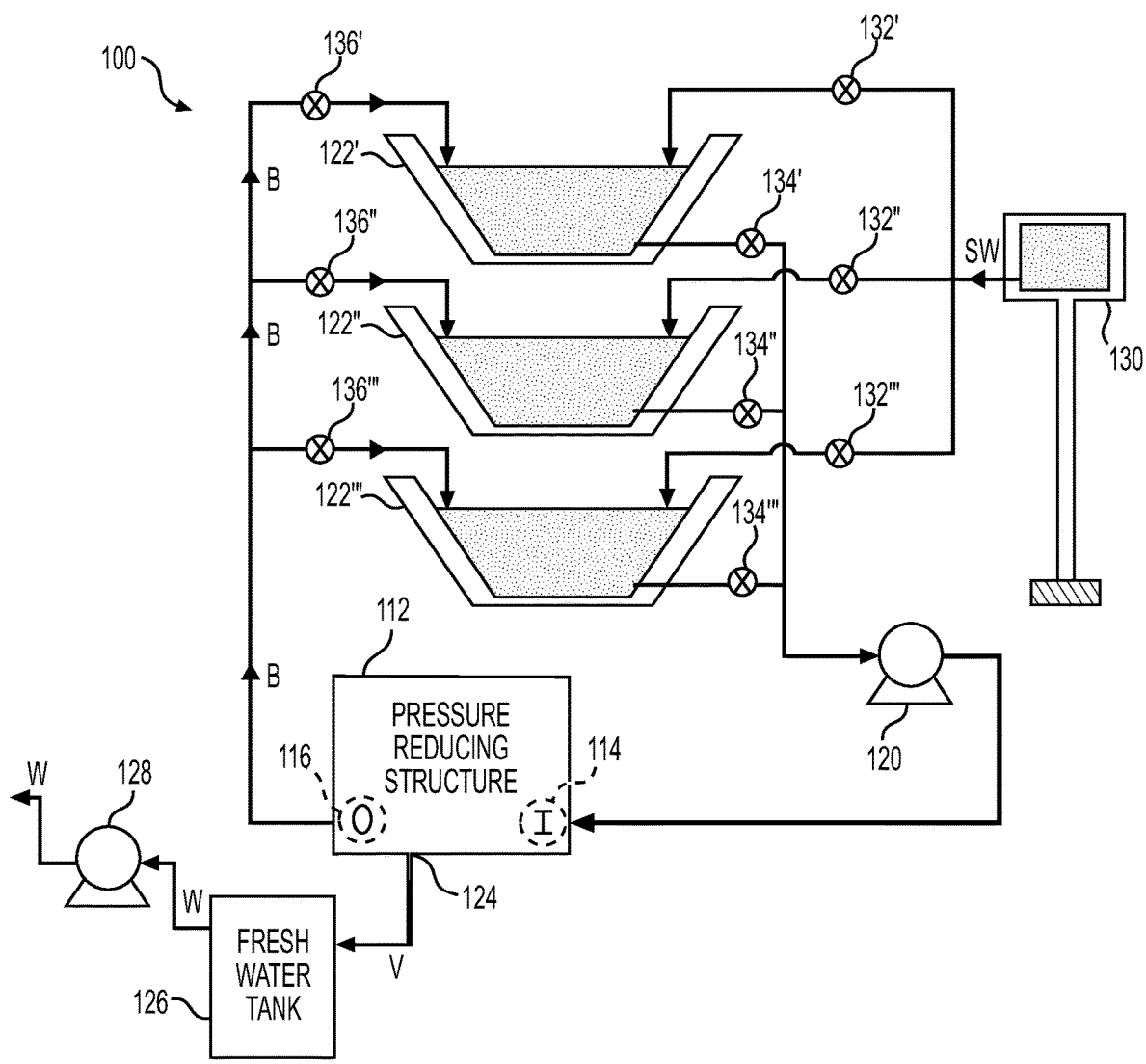
FIG. 2 is a schematic diagram of an alternative embodiment of a sub-ambient solar desalination system.

In the alternative embodiment shown in FIG. 2, multiple solar ponds 122', 122" and 122''' are used. As in the previous embodiment, beginning with the first solar pond 122', saltwater is drawn therefrom by a liquid pump 120. Each of solar ponds 122', 122" and 122''' has a corresponding outlet valve 134', 134" and 134''', respectively, associated therewith. Thus, as saltwater is drawn from the first solar pond 122', valve 134' is open and the other two valves 134" and 134''' are closed. The pressure reducing structure 112 may, for example, be configured as shown in FIG. 3A, 3B, 3C, or 3D, as described above. As in the previous embodiment, a constriction exists or elevation is achieved as the saltwater flows from the inlet portion 114 into the central portion of the pressure reducing structure 112. The gain in either the kinetic energy or the potential energy the saltwater attains by passing from the inlet portion into the central portion is balanced by a drop in pressure of the saltwater within the central portion. The pressure reducing structure 112 is specifically dimensioned such that its pressure within the central portion is below the critical (saturation) pressure for saltwater at the temperature of the saltwater exiting the solar pond 122'. As in the previous embodiment, a portion of the saltwater will vaporize, resulting in pure water vapor V and a concentrated brine solution B.

In addition to the inlet portion 114 and the outlet portion 116, the pressure reducing structure 112 includes a vapor outlet 124 for releasing the pure water vapor V, which is then collected within a fresh water tank 126, where it will condense into pure liquid water W. The pure liquid water W may then be drawn off to the fresh water tank 126 by a vacuum pump 128 for drinking or other use. The brine B is still flowing under pressure caused by the liquid pump 120, exits through the outlet portion 116 of the pressure reducing structure 112 and is recycled back into the solar pond 122', where it is diluted with the saltwater still remaining within the solar pond 122'. Each of the solar ponds 122', 122" and 122''' has a corresponding inlet valve 136', 136" and 136''', respectively, associated therewith. Thus, as brine B is circulated to the first solar pond 122', inlet valve 136' is open, but the other two inlet valves 136" and 136''' are closed. In order to control the salinity within the solar pond 122', additional saltwater SW can be delivered from an external tank 130 under the control of a valve 132' or the like. Solar ponds 122" and 122''' each have similar valves 132" and 132''', respectively, allowing saltwater SW to be added only as needed to the solar pond.

Once the circulation of brine B to first solar pond 122' is complete, the outlet valve 134" of the second solar pond 122" can be opened, allowing the process to begin again with fresh saltwater from the second solar pond 122". This allows the system 100 to operate continuously without having to wait for a single solar pond to complete a full cycle, including the heating of the solar pond with solar radiation. Once the cycle has completed for the second solar pond 122", the cycle may begin again using the third solar pond 122'''. By the time the cycle of the third solar pond 122''' is complete, the saltwater in the first solar pond 122' may be sufficiently heated to begin a new cycle using first solar pond 122'. It should be understood that the three solar ponds 122', 122" and 122''' are shown in FIG. 2 for exemplary purposes only, and that any number of solar ponds may be connected for sequential usage.

The efficiency of the sub-ambient solar desalination system 10 can be evaluated using $\dot{Q}_{solar,absorbed} = \eta I A_{pond}$, where $\eta$ is the efficiency of the solar pond, I is the solar irradiance, $A_{pond}$ is the surface area of the solar pond 22, and $\dot{Q}_{solar,absorbed}$ is the time rate of change of the thermal energy of the saltwater SW within the solar pond 22. At an average daily solar irradiance of 500 W/m$^2$ over 12 hours, and a solar pond with an exemplary surface area of 100 m$^2$ and an efficiency of 85%, a solar pond is capable of harvesting approximately 1,836 MJ per day. This amount of thermal energy is sufficient to evaporate about 787 L of water under normal atmospheric pressure. The amount of evaporated pure water is expected to significantly increase by using the pressure reducing structure 12 of the system 10.

It is to be understood that the sub-ambient solar desalination system is not limited to the specific embodiments described above, but encompasses any and all embodiments within the scope of the generic language of the following claims enabled by the embodiments described herein, or otherwise shown in the drawings or described above in terms sufficient to enable one of ordinary skill in the art to make and use the claimed subject matter.

We claim:

1. A sub-ambient solar desalinization system, comprising:
   a solar pond for receiving saltwater and heating the saltwater through direct exposure to solar radiation at atmospheric pressure;
   a pressure reducing structure having an inlet portion, an outlet portion and a central portion, the inlet portion being in fluid communication with the solar pond for receiving heated saltwater therefrom, the pressure reducing structure for ensuring that pressure of the heated saltwater within the central portion has a reduced sub-ambient pressure to undergo a phase change to produce pure water vapor and a concentrated brine solution, the pressure reducing structure having a vapor outlet for releasing the pure water vapor; and
   a fresh water tank in communication with the water vapor outlet for receiving the pure water vapor for condensation thereof into pure liquid water, the solar point being in fluid communication with the outlet portion of the pressure reducing structure for recycling the concentrated brine solution back to the solar pond.

2. The sub-ambient solar desalinization system as recited in claim 1, further comprising a pump disposed between the solar pond and the pressure reducing structure for driving the heated saltwater at an atmospheric pressure from the solar pond through the pressure reducing structure.

3. The sub-ambient solar desalinization system as recited in claim 1, further comprising an external tank connected to the solar pond for storing saltwater, the external tank being in fluid communication with the solar pond for controlling salinity of the saltwater within the solar pond.

4. The sub-ambient solar desalinization system as recited in claim 1, wherein the inlet portion and the outlet portion of said pressure reducing structure are each conical, the central portion of said pressure reducing structure extending between the conical inlet and the outlet portions and having a smaller diameter than the conical inlet and outlet portions to produce a sub-ambient pressure in the central portion resulting in a phase change to convert a portion of the saltwater into pure water vapor and concentrated brine.

5. The sub-ambient solar desalinization system as recited in claim 4, wherein the vapor outlet of said pressure reducing structure extends from the central portion of said pressure reducing structure, the system further having a vacuum pump connected to the vapor outlet via said fresh water tank for extracting the pure water vapor from said pressure reducing structure.

6. The sub-ambient solar desalinization system as recited in claim 1, wherein the inlet portion and the outlet portion of said pressure reducing structure area each flattened and cylindrical, the central portion of said pressure reducing structure extending between the flattened, cylindrical inlet and outlet portions and having a smaller diameter than the flattened, cylindrical inlet and outlet portions to produce a sub-ambient pressure in the central portion resulting in a phase change to convert a portion of the saltwater into pure water vapor and concentrated brine.

7. The sub-ambient solar desalinization system as recited in claim 6, wherein the vapor outlet of said pressure reducing structure extends from the central portion of said pressure reducing structure, the system further having a vacuum pump connected to the vapor outlet via said fresh water tank for extracting the pure water vapor from said pressure reducing structure.

8. The sub-ambient solar desalinization system as recited in claim 1, wherein the inlet portion, the outlet portion, and the central portion of said pressure reducing structure are each equal in diameter, the inlet portion of said pressure reducing structure sloping upward, the outlet portion extending horizontally at a higher elevation than the inlet portion, and the central portion forming a bend connecting the inlet and outlet portions to produce a sub-ambient pressure in the central portion and the outlet portion resulting in a phase change to convert a portion of the saltwater into pure water vapor and concentrated brine.

9. The sub-ambient solar desalinization system as recited in claim 8, wherein the vapor outlet of said pressure reducing structure extends from the outlet portion of said pressure reducing structure, the system further having a vacuum pump connected to the vapor outlet via said fresh water tank for extracting the pure water vapor from said pressure reducing structure.

10. The sub-ambient solar desalinization system as recited in claim 1, wherein:
  wherein the inlet portion, the outlet portion, and the central portion of said pressure reducing structure are each equal in diameter; and
  the inlet portion slopes upward, the central portion extends horizontally between the inlet and outlet portions, and the outlet portion slopes downward from the central portion, the central portion being at a higher elevation than both the inlet and outlet portions to produce a sub-ambient pressure in the central portion resulting in a phase change to convert a portion of the saltwater into pure water vapor and concentrated brine.

11. The sub-ambient solar desalinization system as recited in claim 10, wherein the water vapor outlet of said pressure reducing structure extends from the central portion of said pressure reducing structure, the system further having a vacuum pump connected to the vapor outlet via said fresh water tank for extracting the pure water vapor from said pressure reducing structure.

12. A sub-ambient solar desalinization system, comprising:
  a first solar pond for receiving first saltwater and heating the first saltwater through direct exposure to solar radiation at atmospheric pressure;
  a pressure reducing structure having an inlet portion, an outlet portion, and a central portion, the inlet portion being in fluid communication with the first solar pond for receiving heated first saltwater therefrom, the pressure reducing structure for ensuring that pressure of the heated first saltwater within the central portion has a reduced sub-ambient pressure to undergo a phase change to produce first pure water vapor and a first concentrated brine solution, the pressure reducing structure having a vapor outlet for releasing the first pure water vapor;
  a fresh water tank in communication with the water vapor outlet for receiving the first pure water vapor for condensation thereof into pure liquid water, the first solar point being in fluid communication with the outlet portion of the pressure reducing structure for recycling the first concentrated brine solution back to the first solar pond; and
  at least one second solar pond for receiving second saltwater and heating the second saltwater through direct exposure to the solar radiation, the inlet portion of the pressure reducing structure being in fluid communication with the at least one second solar pond for receiving heated second solar saltwater therefrom, and the pressure reducing structure for ensuring that pressure of the heated second saltwater within the central portion has a reduced sub-ambient pressure to undergo a phase change to produce second pure water vapor and a second concentrated brine solution, the vapor outlet releasing the second pure water vapor, the fresh water tank receiving the second pure water vapor for condensation thereof into additional pure liquid water, the at least one second solar pond being in fluid communication with the outlet portion of the pressure reducing structure for recycling the second concentrated bring solution back to the at least one second solar pond.

13. The sub-ambient solar desalinization system as recited in claim 12, further comprising:
  a first outlet valve connected between the first solar pond and the pressure reducing structure for controlling flow of the heated first saltwater from the first solar pond to the pressure reducing structure;
  at least one second outlet valve connected between the at least one second solar pond and the pressure reducing structure for controlling flow of the heated second saltwater from the at least on second solar pond to the pressure reducing structure;
  a first inlet valve connected between a Venturi tube and the first solar pond for controlling flow of the first concentrated brine solution from the pressure reducing structure to the first solar pond; and
  at least one second inlet valve connected between the pressure reducing structure and the at least one second solar pond for controlling flow of the second concentrated brine solution from the pressure reducing structure to the at least one second solar pond.

14. The sub-ambient solar desalinization system as recited in claim 12 further comprising and external tank for storing saltwater, the external tank being in fluid communication with the first solar pond and the at least one second solar pond for selectively controlling salinity of the first saltwater and the at least one second saltwater.

15. A sub-ambient solar desalination method, comprising the steps of:
  heating saltwater within a solar pond through direct exposure of the saltwater to solar radiation at atmospheric pressure;

extracted heated saltwater from the solar pond and delivering the heated saltwater to a pressure reducing structure;

reducing pressure of the heated saltwater within a central portion of the pressure reducing structure, such that the pressure of the heated saltwater within the central portion has a reduced sub-ambient pressure to undergo a phase change to produce pure water vapor and a concentrated brine solution;

collecting and condensing the pure water vapor into pure liquid water; and returning the concentrated brine solution to the solar pond.

16. The sub-ambient solar desalination method as recited in claim 15, further comprising the step of selectively adjusting salinity of the saltwater within the solar pond.

\* \* \* \* \*